United States Patent [19]

Jaskie et al.

[11] Patent Number: 5,044,736
[45] Date of Patent: Sep. 3, 1991

[54] CONFIGURABLE OPTICAL FILTER OR DISPLAY

[75] Inventors: James E. Jaskie, Scottsdale; Curtis D. Moyer, Phoenix, both of Ariz.

[73] Assignee: Motorola, Inc., Schaumburg, Ill.

[21] Appl. No.: 609,539

[22] Filed: Nov. 6, 1990

[51] Int. Cl.⁵ .................... G02B 26/00; G02B 27/28; G02B 5/30; G02B 27/00
[52] U.S. Cl. ................... 359/291; 359/498; 359/589; 359/583; 359/885
[58] Field of Search ............. 350/359, 360, 355, 311, 350/312, 314, 384, 390, 391, 372, 404, 163, 172, 339 F, 395

[56] References Cited

U.S. PATENT DOCUMENTS

| | | | |
|---|---|---|---|
| 4,240,696 | 12/1980 | Tracy et al. | 350/163 |
| 4,322,130 | 3/1982 | Ito et al. | 350/395 |
| 4,494,826 | 1/1985 | Smith | 350/359 |
| 4,497,544 | 2/1985 | Mitchell et al. | 350/359 |
| 4,556,288 | 12/1985 | Sekimura | 350/339 F |
| 4,633,131 | 12/1986 | Khurgin | 350/163 |
| 4,982,184 | 1/1991 | Kirkwood | 350/360 |
| 4,997,261 | 3/1991 | Taniura | 350/404 |

Primary Examiner—Eugene R. LaRoche
Assistant Examiner—Evelyn A. Lester
Attorney, Agent, or Firm—Stuart T. Langley

[57] ABSTRACT

A configurable display comprising a distributed Bragg reflector having a plurality of flexible, compressible polymer layers is provided. The polymer layers are transparent and comprise alternating layers of differential index of refraction material so that a reflective surface is formed at each interface between the alternating layers. The polymer layers are sandwiched between a first electrode which is transparent and a second electrode. Thickness of each of the layers is designed such that light reflecting from the reflective surfaces interferes constructively at predetermined wavelengths. The thickness of each of the layers is altered by application of a static potential between the first and second electrodes which deforms the polymer layers thereby shifting the wavelength at which constructive interference occurs. In this manner wavelength and amplitude of reflective light can be modulated by a voltage applied between the first and second electrodes.

12 Claims, 1 Drawing Sheet

CONFIGURABLE OPTICAL FILTER OR DISPLAY

BACKGROUND OF THE INVENTION

This invention is related in general to optical filters, and more particularly to optical filters which are configurable and can be used as displays.

Optical filters find widespread utility in such diverse applications as sunglasses, scientific instruments, optical communication systems, and optical data processing. Optical filters may comprise diffraction or reflection gratings. A diffraction grating would be characterized as a transmissive filter, while a reflection grating would be characterized as a reflective filter. A distributed Bragg reflector is another type of filter which can be used as a transmissive or reflective filter. A distributed Bragg reflector comprises alternating layers of transparent material wherein the alternating layers have different indices of refraction with respect to each other. A partially reflective surface exists at the interface between each layer due to the difference in index of refraction. Each layer of a distributed Bragg reflector has a predetermined thickness such that light reflected from each of the reflective surfaces interferes constructively for a narrow band of light wavelengths. Wavelengths outside of the narrow band are transmitted through the transparent layers.

An optical display can be formed using an optical filter which can be tuned, or configured. By tuning the filter element a light signal can be controllably transmitted or not transmitted to a receiver or viewer. Liquid crystal displays (LCDs) are an example of an optical filter which can be used as a reflective or transmissive display. In their simplest form, LCDs can be switched between opaque and transmissive using an electric signal. Likewise, any optical filter which can be switched between opaque and transmissive can be used as a display element. Preferably, if the filter element can be used to select between a narrow band of wavelengths of reflection rather than being merely turned on and off it can be used as a color display.

A tunable and configurable optical filter can be used in optical communication systems and optical data processing systems. A single filter which can be tuned to a particular light wavelength can separate out a number of separate data signals traveling along a single fiber optic transmission line, for example. Other uses for a tunable optical filter are readily apparent.

Until now switchable, or configurable, filter elements have been formed on rigid, inflexible substrates. Although filter elements are known which can be formed in flexible materials, these filter elements have not been configurable and so are of little use as displays or in communication and computation equipment. Further, LCDs require relatively expensive materials and processing techniques, particularly when a color display is desired.

Another important feature of a configurable filter is that it uses relatively low power so that it can be used in applications such as portable computers, automobiles, and military equipment. State-of-the-art LCDs are relatively low power, but further improvement is desirable.

Accordingly, it is an object of the present invention to provide a configurable display which can switch multiple colors of light.

Another object of the present invention is to provide an optical display which is flexible.

A further object of the present invention is to provide a reflective display which uses low power.

Another object of the present invention is to provide a tunable optical filter for optical communication use.

A further object of the present invention is to provide a tunable and configurable optical filter for optical data processing.

Still another object of the present invention is to provide a configurable display which can be manufactured at low cost using simple manufacturing methods and low cost materials.

SUMMARY OF THE INVENTION

These and other objects and advantages of the present invention are achieved by a configurable display comprising a distributed Bragg reflector having a plurality of flexible, deformable polymer layers. The polymer layers are transparent and formed of alternating layers of differential index of refraction material so that a partially reflective surface is formed at each interface. In a preferred embodiment, seven reflective surfaces are formed. The polymer layers are sandwiched between a first electrode which is transparent and a second electrode which is transparent if the device is to operate in a transmissive mode and optically absorptive if the device is to operate in a reflective mode.

Thickness of each of the layers is designed such that light reflecting from the reflective surfaces interferes constructively at predetermined wavelengths. The thickness of each of the layers can be altered by application of a static potential between the first and second electrodes which increases or decreases thickness of the polymer layers thereby shifting the wavelength at which constructive interference occurs. In this manner wavelength and amplitude of reflective light can be modulated by a voltage applied between the first and second electrodes. In a preferred embodiment a plurality of configurable filter elements are formed in an array so that each element forms a pixel of a display.

DETAILED DESCRIPTION OF THE DRAWINGS

Although a wide variety of optical display technologies and devices are used today, none offer the advantages of being both configurable and flexible. By configurable it is meant that the filter or display can be electrically controlled so that the information which is displayed can be changed. Examples of configurable displays are conventional cathode ray tubes and liquid crystal displays (LCDs). By flexible it is meant that the entire substrate on which the display is formed can be bent or molded to a particular shape. A flexible computer display, for example, could be rolled up like a movie screen. Another example which is particularly useful in automotive application is an instrument panel display which can be applied to an instrument panel like an adhesive tape. A flexible optical filter or display could be applied to a windshield and conformed to the complex curves used in modern windshields. It should be apparent that a truly flexible, configurable display has great utility.

Figure 1:
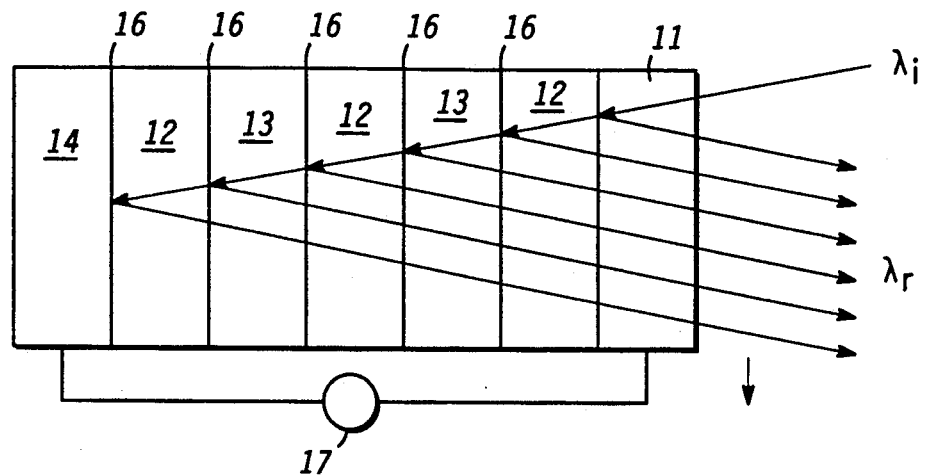
FIG. 1 illustrates a cross-sectional view of a configurable filter according to the present invention.

FIG. 1 illustrates a somewhat simplified crosssectional view of a configurable display according to the present invention. FIG. 1 illustrates a reflective display in that incident light $\lambda_i$ enters a first surface of the display and is controllably reflective out of the same surface. The reflected signal $\lambda_r$ is viewed or detected by looking at the same surface upon which the light is incident. An important feature of the present invention is that electrode 11 is transparent. Transparent electrodes can be formed by thin films of metal such as gold or by materials such as indium tin oxide which is transparent.

The configurable filter in accordance with the present invention comprises alternating polymer layers 12 and 13. Layers 12 and 13 must be deformable and transparent. Polymer layers 12 and 13 differ from each other primarily in index of refraction. For example, in a preferred embodiment layers 12 have an index of refraction of 1.3 and polymer layers 13 have an index of refraction of 1.7. Examples of suitable materials for layers 12 and 13 are silicones, where the refractive index may be changed by modification of the density of the material. This differential index of refraction creates a reflective surface 16 at the interface between layers 12 and 13.

As each reflective surface 16 is not one hundred percent reflective, a portion of $\lambda_i$ will be reflected at each interface and a portion will continue through the next interface 16. At the next reflective surface 16, reflection will again occur, sending an additional portion of light back out through electrode 11. Peak reflection amplitude occurs for a light wavelength equal to four times the optical thickness of a layer 12 or 13. Optical thickness of a layer 12 or 13 equals the physical layer thickness multiplied by the layer's index of refraction. Subsequent reflections add coherently and subsequent transmissions subtract coherently, resulting in an optical pass band filter. In a preferred embodiment, optical thicknesses of both layers 12 and 13 are designed to be one quarter of the desired peak reflection wavelength.

FIG. 1 illustrates a configurable filter having four reflective surfaces 16. In a preferred embodiment, seven reflective surfaces 16 are formed by alternating polymer layers 12 and 13. Computer models of the configurable display indicate that seven reflective surfaces result in a total reflection $\lambda_r$ of nearly 76% of the energy of $\lambda_i$. More layers will result in a higher efficiency, although it is believed that additional layers beyond seven reflective surfaces will provide only minor improvement. Incident light $\lambda_i$ will continue through the body of the configurable display until reaching second electrode 14. For the reflective display shown in FIG. 1, electrode 14 comprises an optically absorptive material such as polyacethylene. The optically absorptive electrode reduces internal reflections which would decrease effectiveness of the device.

It should be noted that reflected light $\lambda_r$ which exits through electrode 11 may interfere constructively or destructively. Constructive interference would result in visible light being reflected, while destructive interference results in an absence of reflected light. Whether reflected light $\lambda_r$ interferes constructively or destructively is determined largely by the optical thickness of layers 12 and 13. Constructive interference occurs when the relationship $n_i d_i = N(\lambda_i/4)$ is satisfied, where N is an odd integer, $n_i$ is the index of refraction of a particular layer and $d_i$ is the thickness of that particular layer and $\lambda_i$ is the wavelength of light incident on the optical filter.

Once the polymer materials have been chosen for the layers 12 and 13 thereby determining index of refraction for each layer, the thickness of each layer can be calculated using the above relationship to ensure constructive interference of a desired incident wavelength $\lambda_i$. It should be noted that to satisfy the above relationship, the thickness of layers 12 and 13 will differ as did their indexes of refraction. It should also be noted that if this relationship is not maintained, light reflected from each of the interfaces will interfere destructively greatly reducing the amplitude of light output $\lambda_r$.

Charge supply 17 is used to control electrostatic potential between electrodes 11 and 14. Charge supply 17 can be used to increase or decrease electrostatic potential between the two electrodes to apply a tuning force to layers 12 and 13. When no charge is forced on electrodes 11 and 14, polymer layers 12 and 13 will be relaxed and have a thickness close to their originally applied thickness. If positive charge is placed on one electrode and negative charge on the opposite electrode, the two electrodes will attract thus compressing the spacing between polymer layers 12 and 13. This compressing destroys constructive interference for a particular wavelength of incident light $\lambda_i$.

In a preferred embodiment layers 12 and 13 deform under the applied tuning force such that their optical thicknesses remain about equal. The compression can thus be though of as shifting the wavelength of reflected light $\lambda_r$ if a broad spectrum of $\lambda_i$ is incident on the reflective filter. If compression is severe enough, no visible wavelength will interfere constructively and thus the filter element will appear dark. A similar effect will be achieved if positive charge is placed on both electrodes 14 and 11, forcing electrodes 14 and 11 to repel each other and increase spacing between polymer layers 12 and 13.

Figure 2:
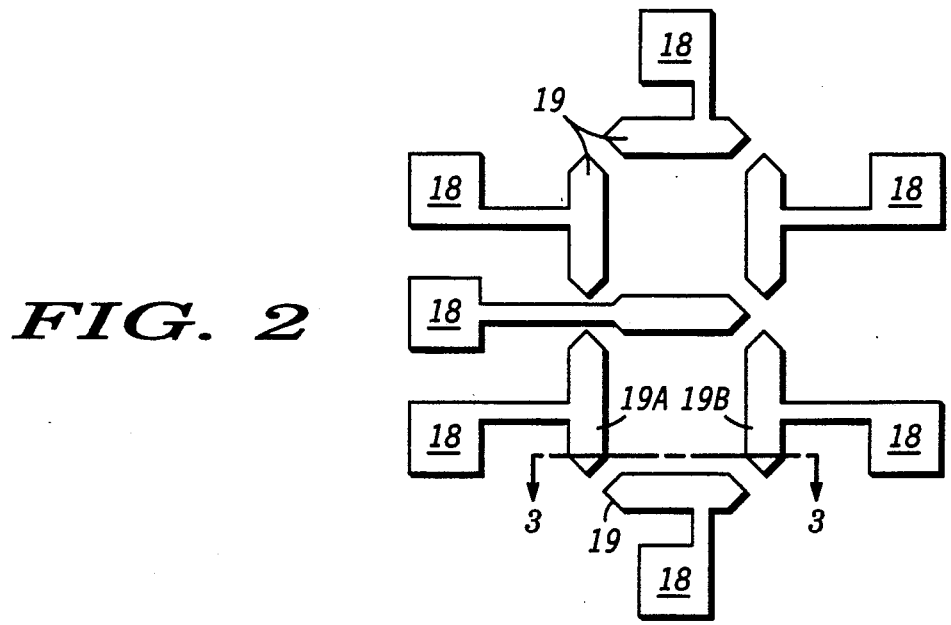
FIG. 2 illustrates a top view of a numeric display according to the present invention.

FIG. 2 illustrates a top view of a conventional seven segment numeric display illustrating a useful application of the present invention. FIG. 2 illustrates a display similar to conventional LED or LCD displays used in calculators and computers. The display can be formed by patterning electrode 11 shown in FIG. 1 to form a plurality of display elements 19. Although shown in a conventional seven-segment display, it should be apparent that display elements 19 could be formed in any shape and could easily be patterned as pixels in a large array of display elements. Each display element 19 is coupled to an electrode 18 which is used to apply charge to electrode 11 shown in FIG. 1. By varying the charge applied display elements 19 can be made reflective or non-reflective to incident light wavelengths. Alternatively, reflectivity of interfaces 16 shown in FIG. 1 may be merely altered so that the color of display elements 19 changes rather than the digital response illustrated in FIG. 2. A cross-section through dashed line 3—3' is shown in FIG. 3.

Figure 3:
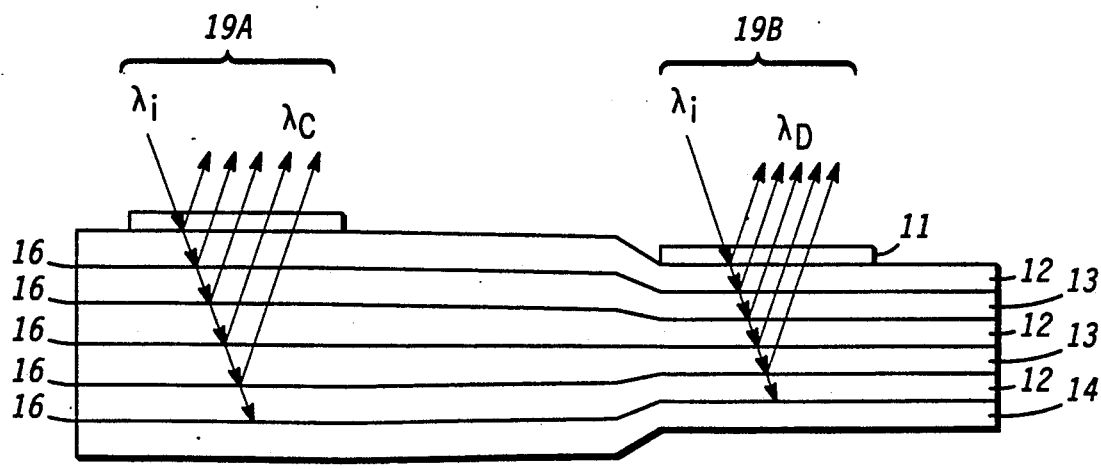
FIG. 3 illustrates a cross-sectional view of the display shown in FIG. 2.

FIG. 3 shows a cross-section of the display shown in FIG. 2 including absorbing electrode 14, alternating polymer layers 12 and 13, and patterned transparent electrode 11. In the embodiment illustrated in FIGS. 2-3, polymer layers 12 and 13 are designed to be normally reflective to incident light $\lambda_i$. This means that in a relaxed state with no voltage applied between electrodes 11 and 14, $\lambda_i$ will reflect constructively at each interface 16. Thus, the areas between patterned electrodes 11 will be normally reflective as no potential is applied to those regions and the polymer layers remain in their normal relaxed state. The display element 19a illustrates constructive reflection from a display element. Because display element 19a reflects light of the same intensity and wavelength as the background between patterned electrodes 11, it will appear virtually invisible against the background.

Display element 19b, however, reflects light destructively due to compression caused by electrostatic attraction between electrode 11 and electrode 14. Destructive interference results in a dark spot in the reflected image from display element 19b. It should be noted that compression of polymer layers 12 and 13 is greatly exaggerated for purposes of illustration in FIG. 3. Normally, the change in thickness in each of the layers will be in the order of a few tens or hundreds of angstroms as this is all that is required to effectively shift wavelength and amplitude of the reflected light $\lambda_r$.

It may be desireable to prefilter or post filter the light entering the configurable filter using a fixed, non-configurable filter. The configurable filter shown in FIG. 1 has a maximum reflectivity at a predetermined band of wavelengths in it relaxed state. Once a tuning force is applied to electrodes 11 and 14, maximum reflectivity occurs at a different wavelength. Prefiltering so that the light entering through electrode comprises only wavelengths in the predetermined band results in an optical on-off switch for switching light. Post filtering the light as it exits electrode 11 provides a similar result.

By now it should be appreciated that a flexible, configurable optical display is provided using relatively inexpensive materials and a combination of widely available technologies. Transparent, deformable polymer layers sandwiched between two electrodes allow thickness of the polymer layers to be modulated by controlling electrostatic potential the two electrodes. As only electrostatic potential is required, the filter element requires little power.

With one of the electrodes transparent and the other absorptive, the transparent electrode can be patterned to provide a plurality of reflective display elements on a common substrate. If both electrodes are transparent the device will function as a transmissive display. A plurality of reflective surfaces are formed at the interfaces between alternating layers of various indexes of refraction material. Constructive or destructive interference of the light reflected from each of the interfaces can be modulated by changing the thickness of each of the layers. As each of the polymer layers, absorptive electrode, and transmissive electrode are flexible and thin, the entire display can be rolled up and stored compactly or can be applied to complex surfaces easily.

We claim:

1. An optical display having a plurality of pixels, each pixel comprising: a first transparent electrode; a first layer of resilient transparent material mechanically coupled to the first transparent electrode, wherein the first layer has an index of refraction $n_i$; a second layer of resilient transparent material having an index of refraction $n_2$, wherein the second layer contacts the first layer to form a reflective interface; and a second electrode mechanically coupled to the second layer.

2. The optical display of claim 1 further comprising a plurality of alternating first and second layers sandwiched between the first and second electrodes.

3. The optical display of claim 1 wherein $n_1$ is approximately 1.3 and $n_2$ is approximately 1.7.

4. The optical display of claim 1 wherein the first transparent electrode comprises indium tin oxide.

5. The optical display of claim 1 wherein the second electrode is optically absorptive.

6. The optical display of claim 5 wherein the second electrode comprises polyacethylene.

7. The optical display of claim 1 wherein the second electrode is transparent.

8. A method of optical filtering comprising: providing a first electrode; providing a second electrode, wherein the second electrode is transparent; providing at least one reflective interface between the first and second electrodes, wherein each reflective interface further comprises a first layer of resilient transparent material having an index of refraction n; and a second layer of resilient transparent material having an index of refraction $n_2$; passing light through the second electrode and the first and second resilient transparent layers, wherein a portion of the light is reflected by the reflective interface; and modulating the emissivity and reflectivity of the reflective interface by compressing or expanding at least one of the resilient transparent layers by modulating the electrostatic potential between the first and second electrode.

9. The method of claim 8 wherein the first electrode is optically absorptive and the light is incident on the second electrode, wherein the portion of the light which is reflected from the reflective interface is emitted through the second electrode.

10. The method of claim 8 wherein the first electrode is optically transparent and the light is incident on the first electrode, wherein the portion of the light which is not reflected is emitted though the second electrode.

11. The method of claim 8 further comprising the step of passing the light through a fixed frequency filter before passing the light through the second electrode.

12. The method of claim 8 further comprising the step of passing the light through a fixed frequency filter after the portion of the light is reflected.

* * * * *